United States Patent [19]
Watson

[11] 4,386,354
[45] May 31, 1983

[54] ELECTROMAGNETIC NOISE SUPPRESSION

[75] Inventor: Andrew W. D. Watson, Emsworth, England

[73] Assignee: Plessey Overseas Limited, Illford, England

[21] Appl. No.: 216,753

[22] Filed: Dec. 15, 1980

[51] Int. Cl.³ .................... G01S 7/36

[52] U.S. Cl. .................... 343/18 A; 114/86; 343/873; 403/40; 312/7.1; 252/572; 106/193 J; 106/197 R; 174/138 D; 174/110 A; 174/110 P

[58] Field of Search .................... 252/570, 572, 579; 174/110 R, 110 A, 138 D; 343/18 A; 114/86, 79; 312/7.1, 7.2; 403/40; 106/193 J, 197 R

[56] References Cited

U.S. PATENT DOCUMENTS

| | | | |
|---|---|---|---|
| 1,899,155 | 2/1933 | Kevelson | 252/579 X |
| 2,098,256 | 11/1932 | Parker | 403/40 X |
| 2,527,918 | 10/1950 | Collard | 343/18 |
| 2,534,311 | 12/1950 | Smith | 114/86 X |
| 2,550,452 | 4/1951 | Byrne et al. | 252/572 X |
| 2,594,971 | 4/1952 | Moullin | 343/18 A |
| 2,901,722 | 8/1959 | Arnott | 252/512 X |
| 2,969,327 | 1/1961 | Quehl | 156/380 X |
| 3,185,986 | 5/1965 | McCaughna et al | 343/18 A |
| 3,247,574 | 4/1966 | Wirtz | 312/7.1 |
| 3,294,682 | 12/1966 | Mackinnon | 403/40 |
| 3,924,238 | 12/1975 | James | 343/873 X |
| 4,024,318 | 5/1977 | Forster | 343/18 A X |

FOREIGN PATENT DOCUMENTS

| | | |
|---|---|---|
| 783805 | 10/1957 | United Kingdom . |
| 1113734 | 5/1968 | United Kingdom . |
| 1208597 | 10/1970 | United Kingdom . |
| 1341513 | 12/1973 | United Kingdom . |
| 2025441 | 1/1980 | United Kingdom . |

OTHER PUBLICATIONS

Enc. of Polymer Sci. & Tech., Interscience vol. 3, pp. 490–492 (1972).

*Primary Examiner*—John D. Welsh
*Attorney, Agent, or Firm*—Fleit, Jacobson & Cohn

[57] ABSTRACT

A method of reducing electromagnetic re-radiation of harmonic and intermodulation products by metal structures, having at least two adjoining elements, in response to an incident electromagnetic signal (rusty bolt effect). The method comprises the application between the adjoining elements of the structure, at their junction, of a layer of a non-water soluble substance having a dielectric constant greater than 10.

10 Claims, No Drawings

ELECTROMAGNETIC NOISE SUPPRESSION

BACKGROUND OF THE INVENTION

This invention relates to the suppression of noise due to static and/or mobile electromagnetic incompatibility.

Complex communications, radar and broadcast systems are always associated with metal structures. Examples are aerial masts and guys, building structures, ships or aircraft etc., on which the system is mounted. When metal structures are irradiated by high power transmitters, non-linearities at metal junctions in the structure cause the generation of harmonic and intermodulation products. These products are re-radiated by the metal structure, and are picked up by near by radio receivers as interference, even though the receivers are tuned to frequencies other than those of the offending transmitters. A large number of harmonic and intermodulation product frequencies can be generated by the effect, particularly in compact multi-transmitter sites, such as ships, and a large number of receiving channels can be blocked. Furthermore if metal junctions are intermittent or subjected to movement or vibration, wide band noise interference can be generated and re-radiated when the structures are irradiated. This give rise to a substantially increased noise level across the whole receiving band and the effect can be caused by only one transmitter. The above effects have generally been refered to as 'the Rusty Bolt effect' and also as 'SEMIC' and 'MEMIC' (Static Electro-Magnetic Incompatibility and Mobile Electro-Magnetic Incompatibility). There are well documented cases of the effect causing severe communications problems with ship communications, radar, vehicle communications installations, airborne communications and navigation, communications satellites and radio broadcast relay stations.

An existing method of 'Rusty Bolt effect' interference reduction is to bypass all metal junctions with a short spot welded metal strap (welded metal junctions do not generate interference when irradiated by RF). This method, is clearly laborious and not convenient.

SUMMARY OF THE INVENTION

We have discovered an alternative method of reducing the interference effects of metal junctions.

According to the invention there is provided a method or reducing electromagnetic re-radiation of harmonic and intermodulation products by metal structures, having at least two adjoining elements, in response to an incident electromagnetic signal (rusty bolt effect), the method comprising the application between said adjoining elements, at their junction, of a layer of a non-water soluble substance having a dielectric constant greater than 10.

The substance may be applied prior to assembly of the junctions or, provided the substance has penetrating properties, it may be applied after assembly.

The substance, may itself have a high dielectric constant, which could be achieved by the substance consisting of polar molecules.

The composition may comprise a suspension of high dielectric constant particles in a low dielectric constant grease (e.g. high K ceramic particles suspended in Silicone grease).

The composition may be a high dielectric, non-water soluble oil or grease etc., as mentioned above, which is contained in its own evaporating liquid chemical solvent. Such a substance would initially have good penetrating properties when applied to metal structures, but when the solvent had evaporated would leave a more permanent film of the grease.

DESCRIPTION OF PREFERRED EMBODIMENTS

In order that the invention and its various other preferred features may be understood more easily, the methods of carrying out the invention and substances suitable for carrying out the method will now be described.

The method of reducing the "rusty bolt" effect involves the provision of a layer of a substance having a high dielectric constant between parts forming a junction. We have found that advantageous effects occur with a dielectric constant exceeding 10 with advantage to be obtained by higher values. In practice we tend to use a value of at least 40. The method can be effected prior to assembly or, provided the substance has penetrating properties, can be effected after assembly. The substance employed may be in the form of a liquid e.g. an oil, a penetrating oil or paint and may be applied in liquid form or spray e.g. aerosol. Alternatively the substance may have high viscosity e.g. a grease.

Clearly, for practical uses, the oil or grease must be non-water soluble so that it is not simply washed off of exposed surfaces. For any given application, the mechanical properties (e.g. viscosity etc.) should be suitable and other general requirements, such as non-toxicity should be met. There has previously been no requirement for a high dielectric oil or grease. All existing oils or greases have low dielectric constants (e.g. 'E'=5). Existing low dielectric constant oils or greases, including carbon loaded greases, aluminium oxide and zinc oxide loaded greases and silicone greases do not suppress the 'Rusty Bolt effect' when applied to metal junctions. The reduction in 'Rusty Bolt effect' interference by high dielectric liquids has been demonstrated by the use of water ('E'=80) Clycerine ('E'=40) and various ethelene glycol compounds ('E'=40 to 70). I have conclusively proved that the reduction in interference is due to the liquid's high dielectric constant and not due to conductivity of the liquid.

These substances are, however, water soluble and are not therefore suitable in practice for reduction of "rusty bolt effect" as their effect is only short lived.

The provision of a high dielectric constant, non water soluble substance suitable for use in the method of present invention may be achieved in various ways. A direct method may be used in which the substance itself has a high dielectric constant, which could be obtained by arranging for the substance to have polarized molecules (the mechanism by which water has its high dielectric constant). A suitable substance is nitrobenzene. Alternatively an indirect method may be used whereby high dielectric solid particles are suspended in an oil or grease having a low dielectric constant. An example of the latter would be high K ceramic particles suspended in silicone grease.

An example of a high dielectric, non water soluble composition which we have developed, and which has demonstrated interference suppression of 30 dB or more, consists of a base using a polyester e.g. ethyl hydroxyethyl cellulose plasticised with 85% to 95% commercial castor oil, compounded with a very fine powder (45 $u_m$) Barium Titanate or a modified Barium Titanate e.g. Barium Strontium Titanate with small additions of tin, calcium and manganese. A formulation of 50% powder : 50% base by volume forms a grease which has been found particularly suitable but a range of 10% to 70% powder provides advantageous properties. The mechanical properties of this compound can be varied from those of a light oil, to a thick grease or a paint, because the base is compatible with a very wide range of plasticisers, oils and solvents.

Examples of bases suitable for making a composition of liquid form are: nitrobenzene or nitrotoluene.

In order to make a composition in the form of an oil any oil base can be employed e.g. castor oil with the addition of particles of a high dielectric organic or inorganic material.

To provide penetrating properties the composition may include a proportion of an evaporable solvent e.g. in the case of an oil base a suitable solvent is white spirit.

A suitable dilution is 40% white spirit. An alternative solvent is n-butyl acetate. In use the solvent evaporates after application to leave a more permanent grease like substance on the coated surface.

An example of a suitable paint is a composition comprising Barium Titanate/castor oil/EHEC (50:40:5 V/V) diluted with 40% Butyl Acetate.

Alternative plasticisers are Butyl Stearate or Dibutyl Phthalate. An alternative high dielectric powder to ceramics is Titanium Oxide. Mixed ceramics or other high dielectric constant materials can be used to improve the consistancy of the high dielectric constant with temperature e.g. materials which have opposite temperature co-efficients.

The compound may also be made conductive as well as having a high dielectric constant, in order to improve the electrical bonding as described above. This could be achieved by the addition of carbon or silver loading. The addition of metallic or carbon powder has been found not only to improve electrical bonding but also to enhance the permittivity of the material. Suitable proportions would be 1 to 60% by volume depending upon the precise physical and electrical characteristics desired. The increased conductivity could be effected by the use of a conductive base material e.g. a conductive polymer such as Tetracyanoquinodimethane, or graphite grease. There are many substances which can be added to improve physical properties, such as pigments, elastomers, olfactants and additives to improve lubrication properties, penetration, bonding, sealing, or to reduce toxicity or irritation.

An immediate application of the invention is in the reduction of noise and intermodulation interference at compact radio communications sites, particularly ships aircraft and vehicles.

It will be understood that the above description of the present invention is susceptible to various modifications, changes and adaptations.

What is claimed is:

1. A method for reducing electromagnetic re-radiation of harmonic and intermodulation products by metal structures, having at least two adjoining elements, in response to an incident electromagnetic signal (rusty bolt effect), the method comprising providing a layer of non-water soluble substance having a dielectric constant greater than 10 between said adjoining elements forming a junction.

2. A method as claimed in claim 1, in which said substance comprises a composition containing particles which have a high dielectric constant.

3. A method as claimed in claim 1, wherein the substance is applied prior to assembly of the junctions.

4. A method as claimed in claim 1, wherein the substance is applied after assembly of the junctions.

5. A method as claimed in claim 1, wherein said substance contains electrically conductive powder.

6. A method as claimed in claim 2 wherein said substance is formed from an electrically conductive base material in which the particles are contained.

7. A method as claimed in claim 2, wherein said substance is a polyester treated with a plasticiser.

8. A method as claimed in claim 7, wherein the polyester is ethyl hydroxyethyl cellulose.

9. A method as claimed in claim 7 or 8, wherein the particles are Barium Titanate.

10. A method as claimed in claim 9, wherein the plasticiser is commercial castor oil.

* * * * *